United States Patent
Masuda et al.

(10) Patent No.: US 9,657,136 B2
(45) Date of Patent: May 23, 2017

(54) PRODUCTION METHOD FOR POLYACETAL COPOLYMER

(71) Applicant: Polyplastics Co., Ltd., Tokyo (JP)

(72) Inventors: Eiji Masuda, Fuji (JP); Tomohiro Monma, Fuji (JP); Tadahiro Horiguchi, Fuji (JP)

(73) Assignee: POLYPLASTICS CO., LTD., Tokyo (JP)

( * ) Notice: Subject to any disclaimer, the term of this patent is extended or adjusted under 35 U.S.C. 154(b) by 90 days.

(21) Appl. No.: 14/442,659

(22) PCT Filed: Oct. 25, 2013

(86) PCT No.: PCT/JP2013/079011
§ 371 (c)(1),
(2) Date: May 13, 2015

(87) PCT Pub. No.: WO2014/083987
PCT Pub. Date: Jun. 5, 2014

(65) Prior Publication Data
US 2016/0280852 A1 Sep. 29, 2016

(30) Foreign Application Priority Data

Nov. 27, 2012 (JP) ................. 2012-258876

(51) Int. Cl.
| | |
|---|---|
| *C08G 2/10* | (2006.01) |
| *C08G 65/26* | (2006.01) |
| *C08G 2/06* | (2006.01) |
| *C08G 2/18* | (2006.01) |
| *C08G 2/28* | (2006.01) |
| *C08G 2/20* | (2006.01) |
| *C08G 65/00* | (2006.01) |

(52) U.S. Cl.
CPC .............. *C08G 65/266* (2013.01); *C08G 2/06* (2013.01); *C08G 2/10* (2013.01); *C08G 2/18* (2013.01); *C08G 2/28* (2013.01)

(58) Field of Classification Search
CPC .......................................................... C08G 2/10
USPC ............................................................ 528/410
See application file for complete search history.

(56) References Cited

U.S. PATENT DOCUMENTS

| | | | |
|---|---|---|---|
| 5,866,670 A | 2/1999 | Nakai et al. | |
| 5,886,139 A | 3/1999 | Yamamoto et al. | |

FOREIGN PATENT DOCUMENTS

| | | |
|---|---|---|
| CN | 1406995 A | 4/2003 |
| JP | 1980-42085 B | 3/1977 |
| JP | 1987-257922 A | 11/1987 |
| JP | 1989-170610 A | 7/1989 |
| JP | 1994-000829 B | 1/1994 |
| JP | 1995-037504 B | 4/1995 |
| JP | 1997-302055 A | 11/1997 |
| JP | 1998-120746 A | 5/1998 |
| JP | 2003-026746 A | 1/2003 |
| JP | 2009-221418 A | 10/2009 |
| JP | 2009-249451 A | 10/2009 |

OTHER PUBLICATIONS

Extended European Search Report in European Patent Application No. 13858778.7, dated May 27, 2016.
Office Action in Chinese Patent Application No. 201380061377.1, dated May 18, 2016.

*Primary Examiner* — Duc Truong
(74) *Attorney, Agent, or Firm* — Knobbe Martens Olson & Bear LLP

(57) ABSTRACT

A production method for a polyacetal copolymer that makes deactivation of a catalyst simple and efficient and that achieves a high polymerization yield and high quality using equipment that does not require a cleaning step and a process that involves a simple operation technique. The production method for a polyacetal copolymer uses trioxane as a main monomer and a cyclic ether and/or a cyclic formal having at least one carbon-carbon bond as a comonomer. In the production method, a predetermined heteropoly acid is used as a polymerization catalyst to perform copolymerization, a predetermined salt is added to the reaction product, melt kneading processing is performed, and the polymerization catalyst is deactivated.

6 Claims, No Drawings

PRODUCTION METHOD FOR POLYACETAL COPOLYMER

This application is the U.S. National Phase under 35 U.S.C. §371 of International Application PCT/JP2013/079011, filed Oct. 25, 2013, designating the U.S., and published in Japanese as WO 2014/083987 on Jun. 5, 2014, which claims priority to Japanese Patent Application No. 2012-258876, filed Nov. 27, 2012, the entire content of which is incorporated herein by reference.

TECHNICAL FIELD

The present invention relates to a production method for a polyacetal copolymer.

BACKGROUND ART

Until now, as a production method for a polyacetal copolymer, a cationic copolymerization with trioxane as a main monomer, and a cyclic ether and/or cyclic formal having at least one carbon-carbon bond as a comonomer has been known. As the cationic active catalyst used for these copolymerizations, a Lewis acid, in particular halides of boron, tin, titanium, phosphorous, arsenic, and antimony, for example boron trifluoride, tin tetrachloride, titanium tetrachloride, phosphorous pentachloride, phosphorous pentafluoride, arsenic pentafluoride, and antimony pentafluoride, and their complex compounds or salts; protonic acids for example perchloro acids; esters of protonic acids, in particular esters of perchloro acids and lower aliphatic alcohols, for example perchloro acid-tertiary butyl ester; anhydrides of protonic acids, especially mixed anhydrides of perchloro acids and lower aliphatic carboxylic acids, for example acetyl perchlorate, or trimethyloxonium hexafluorophosphate, triphenyl-methylhexafluoroacetate, acetyltetrafluoroborate, acetylhexafluorophosphate, and acetylhexafluoroarsenate, and the like have been proposed. Among these, boron trifluoride, or coordination compounds of boron trifluoride and organic compounds, for example ethers, are the most common as polymerization catalysts with trioxane as the main monomer, and are widely used industrially.

However, in generally used polymerization catalysts such as boron trifluoride compounds or the like, a relatively large amount of the catalyst (for example 40 ppm or more with respect to the total monomers) is necessary for polymerization. Therefore, problems may arise such as difficulty in carrying out sufficient catalyst deactivation treatment after polymerization, and even if deactivated, substances deriving from the catalyst may remain in the copolymer, and may promote decomposition of the copolymer, or the like. Further, it is usual that the deactivation process of the catalyst is carried out in a large amount of an aqueous solution comprising a basic compound such as triethylamine or the like, and after the catalyst deactivation complex operations become necessary, such as separating the processing liquid from the copolymer and drying, recovering the unreacted monomer dissolved in the processing liquid, and the like, which also include economical problems.

In order to eliminate such complications accompanying the deactivation process of the catalyst, a method of adding a tertiary phosphorous compound to the produced copolymer (for example, refer to Patent Document 1 and the like), and a method of adding a hindered amine compound (refer to Patent Document 2 and the like) have been proposed, but the desired effects have not been obtained.

In contrast to this, a production method for a polyacetal copolymer using a heteropoly acid as a catalyst has been proposed (for example, refer to Patent Document 3 and the like). Further, a production method for a polyacetal copolymer has been proposed where, after carrying out the preparation of a crude polyacetal copolymer by copolymerization with a heteropoly acid as a catalyst, a solid basic compound which is at least one selected from a triazine ring-containing compound having an amino group or a substituted amino group, and a polyamide, is added to the reaction products, and deactivation of the catalyst is carried out by a melt kneading process (for example, refer to Patent Document 4 and the like). According to these methods, because heteropoly acids have high activity it becomes possible to polymerize with an extremely small amount of catalyst, and it is possible to provide a high quality polyacetal copolymer. Further, because the deactivation of the catalyst is carried out by a melt kneading process substantially without using a solvent, complex processes such as those mentioned above are not required, which is also economically favorable.

Patent Document 1: Japanese Examined Patent Application Publication No. S55-42085

Patent Document 2: Japanese Unexamined Patent Application, Publication No. S62-257922

Patent Document 3: Japanese Unexamined Patent Application, Publication No. H01-170610

Patent Document 4: Japanese Unexamined Patent Application, Publication No. 2003-026746

DISCLOSURE OF THE INVENTION

Problems to be Solved by the Invention

In recent years, there has been demand for a high quality polyacetal copolymer, especially one having excellent heat stability, and with an extremely low formaldehyde generation amount, but it is difficult to meet these requirements with the methods disclosed in Patent Documents 1 to 4. In order to meet these requirements, there is demand for further improvements such as more efficient deactivation of the catalyst, and then stabilization of the unstable terminal portions of the crude polyacetal copolymer after the catalyst deactivation by more complete decomposition processing, and the like.

The objective of the present invention is to provide a production method for a stabilized polyacetal copolymer where, due to the selection of the catalyst, the catalyst deactivation agent, a selective mixture, the unstable terminal treatment agent or a selective combination thereof, the deactivation of the catalyst is simple and efficient and whereby, with a process where a washing step is unnecessary and where the equipment and operating techniques are simple, the polymerization yield is high, and further where the unstable terminals are extremely few, which is extremely stable to heat, and which has an extremely low formaldehyde emission amount.

Means for Solving the Problems

The present inventors, as a result of diligent study concerning the types of catalysts which can achieve the above objectives, as well as catalyst deactivation methods and unstable terminal processing methods corresponding thereto, discovered that, in addition to use of the heteropoly acid shown in General Formula (I) below as a catalyst, for catalyst deactivation and unstable terminal treatment, by a melt kneading treatment using a carbonate, bicarbonate, or carboxylate of an alkali metal or alkali earth metal, or a hydrate thereof, even if the catalyst activity is high, it is possible to securely and quickly deactivate the catalyst and decrease/stabilize the unstable terminals with an extremely low amount, and further, the equipment and operating techniques are simple, whereby the above objective has been achieved, and thus completed the present invention. The present invention is explained in more detail below.

(1) The present invention is a production method for a polyacetal copolymer with trioxane as a main monomer (a), and a cyclic ether and/or cyclic formal having at least one carbon-carbon bond as a comonomer (b), wherein when producing the polyacetal copolymer, copolymerization is carried out using a heteropoly acid shown by the below General Formula (1) as a polymerization catalyst (c), and the polymerization catalyst (c) is deactivated by adding to a reaction product a carbonate, bicarbonate, or carboxylate of an alkali metal or alkali earth metal or a hydrate thereof (d), and performing a melt kneading treatment.

$$H_m[M^1{}_x \cdot M^2{}_y O_z] \cdot n H_2 O \tag{1}$$

[In the formula (1), $M^1$ indicates a central element consisting of one or two elements selected from P and Si. $M^2$ indicates one or more coordination element selected from W, Mo, and V.

x indicates an integer from 1 to 10, y indicates an integer from 6 to 40, z indicates an integer from 10 to 100, m indicates an integer of 1 or more, and n is an integer of 0 to 50.]

(2) Or, the present invention is a production method for a polyacetal copolymer according to (1) wherein the comonomer (b) is at least one selected from 1,3-dioxolane, diethylene glycol formal, 1,4-butanediol formal, 1,3-dioxane, or ethylene oxide.

(3) Or, the present invention is a production method for a polyacetal copolymer according to (1) or (2) wherein the heteropoly acid is at least one selected from phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, or silicomolybdotungstovanadic acid.

(4) Or, the present invention is a production method for a polyacetal copolymer according to any one of (1) to (3) wherein the carbonate, bicarbonate, or carboxylate of an alkali metal element or alkali earth metal element or a hydrate thereof (d) is (i) at least one carbonate selected from lithium carbonate, sodium carbonate, potassium carbonate, magnesium carbonate, calcium carbonate or barium carbonate, or a hydrate thereof, (ii) at least one bicarbonate selected from lithium bicarbonate, sodium bicarbonate, or potassium bicarbonate, or a hydrate thereof, (iii) at least one aliphatic carboxylate selected from lithium formate, sodium formate, potassium formate, magnesium formate, calcium formate, barium formate, lithium acetate, sodium acetate, potassium acetate, magnesium acetate, calcium acetate, barium acetate, lithium laurate, sodium laurate, potassium laurate, lithium stearate, sodium stearate, potassium stearate, magnesium stearate, calcium stearate, monosodium succinate, disodium succinate, dipotassium succinate, lithium citrate, monosodium citrate, trisodium citrate, sodium aspartate, or disodium glutamate, or a hydrate thereof, (iv) at least one unsaturated aliphatic carboxylate selected from sodium acrylate, potassium acrylate, sodium sorbate, potassium sorbate, or monosodium fumarate, or a hydrate thereof, or (v) at least one aromatic carboxylate selected from lithium benzoate, sodium benzoate, potassium benzoate, potassium biphthalate, lithium salicylate, sodium salicylate, potassium salicylate, or a hydrate thereof.

(5) Or, the present invention is a production method for a polyacetal copolymer according to (4) wherein the carbonate, bicarbonate, or carboxylate of an alkali metal or alkali earth metal or a hydrate thereof (d) is at least one selected from sodium formate, sodium acetate, sodium carbonate, sodium bicarbonate, disodium succinate, sodium laurate, or sodium stearate.

(6) Or, the present invention is a production method for a polyacetal copolymer according to any one of (1) to (5) wherein an added amount of the carbonate, bicarbonate, or carboxylate of an alkali metal or alkali earth metal or a hydrate thereof (d) with respect to 1 kg of the crude polyacetal copolymer obtained by the copolymerization reaction is 0.002 to 1.0 mEq.

(7) Or, the present invention is a production method for a polyacetal copolymer according to any one of (1) to (6) wherein the addition of the carbonate, bicarbonate, or carboxylate of an alkali metal or alkali earth metal or a hydrate thereof (d) to a reaction product is carried out as follows (i) the carbonate, bicarbonate, or carboxylate of an alkali metal or alkali earth metal or a hydrate thereof (d) is directly added as a solution to the crude polyacetal copolymer obtained by the copolymerization reaction, or (ii) a powder of a polyacetal copolymer powder is soaked with a solution of the carbonate, bicarbonate, or carboxylate of an alkali metal or alkali earth metal or a hydrate thereof (d), and is uniformly dispersed, then the powder after the dispersal is added to the crude polyacetal copolymer, or (iii) the carbonate, bicarbonate, or carboxylate of an alkali metal or alkali earth metal or a hydrate thereof (d) remaining in a solid state is uniformly dispersed in a polyacetal copolymer powder, then the powder after the dispersal is added to the crude polyacetal copolymer; and the b value of polyacetal copolymer pellets after deactivation of the polymerization catalyst (c), measured using a differential colorimeter, is 2.0 or less.

Effects of the Invention

According to the present invention, by using a carbonate, bicarbonate, or carboxylate of an alkali metal or alkali earth metal or a hydrate thereof as a polymerization catalyst deactivation agent, it is possible to not only effectively deactivate the polymerization catalyst, but also to stabilize the unstable terminal portions, and to economically produce with simple production steps a high quality polyacetal copolymer which is excellent in thermal stability, and which has an extremely low formaldehyde generation amount.

Further, according to the present invention, in comparison to the wet deactivation method of the prior art, a dry method is used, whereby it is possible to quickly and completely deactivate the polymerization catalyst and then carry out stabilization of the unstable terminal portions, by an extremely streamlined process where the deactivation step is simplified and a washing step is omitted. As a result, it is possible to economically produce an polyacetal copolymer of excellent quality which is free of problems such as decomposition or degradation deriving from the catalyst, which is thermally stable, and further which has an extremely few unstable terminal portions and an extremely low formaldehyde emission amount.

PREFERRED MODE FOR CARRYING OUT THE INVENTION

Below, specific embodiments of the present invention are explained in detail, but the present invention is not at all limited by the following embodiments, and appropriate modifications may be further carried out within the scope of the objective of the present invention.

Production Method for Polyacetal Copolymer

In the present invention, when producing a polyacetal copolymer with trioxane, which is a cyclic trimer of formaldehyde, as the main monomer (a), and a cyclic ether and/or cyclic formal having at least one carbon-carbon bond as a comonomer (b), copolymerization is carried out using a predetermined heteropoly acid as the polymerization catalyst (c), a predetermined salt (d) is added to the reaction products, a melt kneading treatment is performed, and the polymerization catalyst is deactivated.

[Monomer (b)]

As the comonomer, a compound (b) selected from cyclic ethers and cyclic formals having at least one carbon-carbon bond is used. As representative examples of the compound (b) used as the comonomer, for example, 1,3-dioxolane, diethyleneglycol formal, 1,4-butanediol formal, 1,3-dioxane, ethylene oxide, propylene oxide, epichlorohydrin and the like may be mentioned. Among these, in consideration of the stability of the polymerization, 1,3-dioxolane, diethylene glycol formal, 1,4-butanediol formal, 1,3-dioxane, and ethylene oxide and the like are preferable. Further, a cyclic ester, for example β-propiolactone, or a vinyl compound, for example styrene and the like can be used. Further, as the comonomer, it is possible to use a monofunctional cyclic ether or cyclic formal having a substituent unit such as butyl glycidyl ether or 2-ethylhexyl glycidyl ether. Furthermore, as the comonomer, it is possible to use a compound having two polymerizable cyclic ether groups or cyclic formal groups such as a diformal or a diglycidyl ether of alkylene glycol, for example, butanediol dimethylidine glycerol ether, butanediol diglycidyl ether, and the like, or a compound having three or more polymerizable cyclic ether groups or cyclic formal groups such as glycerine triglycidyl ether, trimethylol propane triglycidyl ether, pentaerythyritol tetraglycidyl ether, and the like. Polyacetal copolymers formed therefrom with branched structures or bridged structures are also subjects of the present invention.

In the present invention, the amount of the compound (b) selected from a cyclic ether and a cyclic formal used as the comonomer is from 0.1 to 20 mol %, and preferably 0.2 to 10 mol %, as a ratio of the total monomers (the sum total amount of the main monomer and the comonomer). When less than 0.1 mol %, the unstable terminal portions of the crude polyacetal copolymer generated by the polymerization increase and the stability deteriorates, and when the amount of the comonomer is excessive, the generated copolymer becomes soft and a lowering of the melting point occurs, which is not favorable.

[Polymerization Catalyst (c)]

One characteristic of the present invention is the use of a heteropoly acid as the polymerization catalyst (c) in the production of the polyacetal copolymer as described above.

In the present invention, the heteropoly acid used as the polymerization catalyst (c) is used as a generic term for a polyacid formed by dehydration condensation of differing oxygen acids, which has a specified hetero element at its center, and which has mononuclear or polynuclear complex ions which can be formed by condensing condensation acid radicals. Such a heteronuclear polyacid can be shown by the below General Formula (1).

$$H_m[M^1{}_x \cdot M^2{}_y O_z] \cdot n H_2O \quad (1)$$

In formula (1), $M^1$ indicates a central element consisting of one type or two types of element selected from P and Si. $M^2$ indicates one type or more of a coordination element selected from W, Mo, and V.

x indicates an integer of 1 to 10, y indicates an integer of 6 to 40, z indicates an integer of 10 to 100, m indicates an integer of 1 or more, and n indicates an integer of 0 to 50.

As specific examples of the above heteropoly acids, phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, or silicomolybdotungstovanadic acid and the like may be mentioned. Among these, in consideration of the stability of the polymerization and the stability of the heteropoly acid itself, the heteropoly acid is preferably one or more of silicomolybdic acid, silicotungstic acid, phosphomolybdic acid, or phosphotungstic acid.

In the present invention, the used amount of the above heteropoly acid differs depending on the type thereof, and it can also be appropriately changed in order to adjust the polymerization reaction, but is generally in a range of 0.05 to 100 ppm with respect to the aggregate amount of the monomers to be polymerized (below referred to as mass/mass ppm), preferably 0.1 to 50 ppm. Or, for a heteropoly acid with an exceptionally strong action such as phosphomolybdic acid, phosphotungstic acid or the like, a used amount of 0.1 to 10 ppm is sufficient. Because it is possible to copolymerize even with such a small amount of catalyst, unfavorable reactions such as main chain decomposition or depolymerization or the like of the polymer by the catalyst are restrained so as to be insignificant, and the formation of unstable formate terminal groups (—O—CH=O), hemiacetal terminal groups (—O—CH$_2$—OH) and the like is suppressed, but is nonetheless effective, and economically advantageous.

In order to carry out the reaction uniformly, the polymerization catalyst is diluted in an inactive solvent which has no adverse effects on the polymerization, and is desirably used by adding to the main monomer and/or the comonomer. As the above mentioned inactive solvent, an ester obtained from the condensation of a low molecular weight carboxylic acid with a carbon number of 1 to 10 such as formic acid, acetic acid, propionic acid, butyric acid and the like, and a low molecular weight alcohol with a carbon number of 1 to 10 such as methanol, ethanol, 1-propanol, 2-propanol, 1-butanol, 2-butanol, 2-methyl-1-propanol, 2-methyl-2-propanol, 1-pentanol, 3-methyl-1-butanol, 1-hexanol and the like; or a low molecular weight ketone with a carbon number of 1 to 10 such as acetone, 2-butanone, 2-pentanone, 3-pentanone, 2-hexanone, 3-hexanone, methylisobutyl ketone, methyl-t-butyl ketone and the like, can be preferably mentioned, but it is not limited to these. When also taking into consideration ease of industrial availability and the like, methyl formate, ethyl formate, methyl acetate, ethyl acetate, butyl acetate, acetone, 2-butanone, methyl isobutyl ketone and the like are most favorable. The polymerization catalyst is dissolved in the above inactive solvent, suitably in a concentration of 1 to 30 mass/mass %, but is not limited to this. Further, it is also a preferable method to carry out the polymerization by mixing in advance the above specified amount of the polymerization catalyst with a portion or all of, one of or a plurality of the above mentioned main monomer, comonomer, molecular weight modifying agent and the like, and adding this solution to the polymerization system.

[Preparation of the Copolymer]

In the present invention, the preparation of a crude polyacetal copolymer by polymerization may be carried out with the same equipment as well known copolymerization of trioxane of the prior art. Namely, any of batch type, continuous type, and semicontinuous type are possible, and a method of using liquid monomers, and obtaining a solid powdered aggregate as the polymerization progresses is common. As the polymerization apparatus used for the present invention, for the batch type a generally used reaction vessel equipped with a stirring mechanism, or for the continuous type, a co-kneader, a biaxial screw type continuous extrusion mixer, a biaxial screw paddle type continuous mixer, in addition to continuous polymerization devices for trioxane and the like that have been proposed so far may be used, and it is also possible to use 2 or more types of polymerization devices in combination.

The polymerization method is not particularly limited, but as proposed previously, if the trioxane, comonomer and heteropoly acid as the polymerization catalyst are held in advance in a liquid phase state and sufficiently mixed, and the obtained reaction raw material mixed liquid is supplied to the polymerization apparatus and the copolymerization reaction is carried out, it is possible to reduce the required catalyst amount, and as a result, this is advantageous in that, a polyacetal copolymer with an even lower formaldehyde emission amount is obtained, which is a favorable polymerization method. The polymerization temperature is within a temperature range of 60 to 120° C.

In the present invention, at the time of polymerizing the above described main monomer (a) and the comonomer (b) to prepare the polyacetal copolymer, in order to adjust the degree of polymerization, it is possible to add a known chain transfer agent, for example a low molecular weight linear acetal such as methylal, or the like.

Further, it is desirable to carry out the polymerization reaction in a state where impurities having active hydrogen, for example water, methanol, formic acid and the like are substantially absent, for example, a state where each of these is 10 ppm or less, and for this, it is desirable to use as the main monomer and comonomer trioxane, cyclic ethers and/or cyclic formals which have been prepared to be as free as possible of these impurities.

[Carbonate, Bicarbonate, or Carboxylate of an Alkali Metal Element or Alkali Earth Metal Element or a Hydrate Thereof (d)]

It is a characteristic of the present invention that a carbonate, bicarbonate, or carboxylate of an alkali metal element or alkali earth metal element or a hydrate thereof (d) is added to the polyacetal copolymer obtained as above, which in addition to including the polymerization catalyst also has unstable portions at its terminals (crude polyacetal copolymer), and melt kneading is performed to carry out the deactivation of the polymerization catalyst, and also to decrease and stabilize the unstable terminal groups of the polyacetal copolymer (crude copolymer). Below, the "carbonate, bicarbonate, or carboxylate of an alkali metal element or alkali earth metal element or a hydrate thereof" is referred to as component (d). The stabilization treatment can be carried out more easily and effectively, by processing by adding the above component (d) as is, without carrying out washing or the like of the crude polyacetal copolymer, as is.

The component (d) is preferably any of a carbonate, bicarbonate, aliphatic carboxylate, unsaturated aliphatic carboxylate or aromatic carboxylate of an alkali metal element or alkali earth metal element, or a hydrate thereof. Specifically, lithium carbonate, anhydrous sodium carbonate, sodium carbonate monohydrate, sodium carbonate decahydrate, potassium carbonate, rubidium carbonate, cesium carbonate, magnesium carbonate, calcium carbonate, barium carbonate, lithium bicarbonate, sodium bicarbonate, potassium bicarbonate, cesium bicarbonate, lithium formate monohydrate, sodium formate, potassium formate, rubidium formate, cesium formate, magnesium formate, calcium formate, barium formate, lithium acetate, sodium acetate, sodium acetate trihydrate, potassium acetate, rubidium acetate, cesium acetate, magnesium acetate, calcium acetate monohydrate, magnesium acetate tetrahydrate, barium acetate, sodium laurate, potassium laurate, lithium stearate, sodium stearate, potassium stearate, magnesium stearate, calcium stearate, sodium gluconate, potassium gluconate, lithium lactate, sodium lactate, potassium lactate, lithium oxalate, sodium oxalate, potassium oxalate monohydrate, lithium succinate, monosodium succinate, disodium succinate, disodium succinate hexahydrate, dipotassium succinate, disodium adipate, dipotassium adipate, sodium gluconate, potassium gluconate, lithium lactate, sodium lactate, potassium lactate, disodium malate 1/2 hydrate, disodium malate trihydrate, dilithium tartrate monohydrate, disodium tartrate dihydrate, potassium bitartrate, dipotassium tartrate, potassium sodium tartrate tetrahydrate, sodium rubidium tartrate, lithium citrate tetrahydrate, monosodium citrate, disodium citrate, trisodium citrate, trisodium citrate dihydrate, sodium aspartate monohydrate, disodium glutamate monohydrate, sodium acrylate, potassium acrylate, sodium sorbitate, potassium sorbitate, monosodium fumarate, lithium benzoate, sodium benzoate, potassium benzoate, cesium benzoate, potassium biphthalate, lithium salicylate monohydrate, sodium salicylate, potassium salicylate and the like may be mentioned, but it is not limited to these.

In consideration of industrial availability and the like, it is preferable that the component (d) is lithium carbonate, anhydrous sodium carbonate, sodium carbonate monohydrate, sodium carbonate decahydrate, potassium carbonate, magnesium carbonate, calcium carbonate, barium carbonate, lithium bicarbonate, sodium bicarbonate, potassium bicarbonate, lithium formate monohydrate, sodium formate, potassium formate, magnesium formate, calcium formate, barium formate, lithium acetate, sodium acetate, sodium acetate trihydrate, potassium acetate, calcium acetate monohydrate, magnesium acetate tetrahydrate, barium acetate, sodium laurate, potassium laurate, lithium stearate, sodium stearate, potassium stearate, magnesium stearate, calcium stearate, monosodium succinate, disodium succinate, disodium succinate hexahydrate, dipotassium succinate, lithium citrate tetrahydrate, monosodium citrate, trisodium citrate, trisodium citrate dihydrate, sodium aspartate monohydrate, disodium glutamate, sodium acrylate, potassium acrylate, sodium sorbitate, potassium sorbitate, monosodium fumarate, lithium benzoate, sodium benzoate, potassium benzoate, potassium biphthalate, lithium salicylate monohydrate, sodium salicylate, and potassium salicylate.

The component (d) is preferably any of a carbonate, bicarbonate, aliphatic carboxylate, unsaturated aliphatic carboxylate or aromatic carboxylate of an alkali metal element or alkali earth metal element, or a hydrate thereof. Specifically, lithium carbonate, anhydrous sodium carbonate, sodium carbonate monohydrate, sodium carbonate decahydrate, potassium carbonate, rubidium carbonate, cesium carbonate, magnesium carbonate, calcium carbonate, sodium bicarbonate, potassium bicarbonate, cesium bicarbonate, lithium formate monohydrate, sodium formate, potassium formate, rubidium formate, cesium formate, calcium formate, barium formate, lithium acetate, sodium acetate, sodium acetate trihydrate, potassium acetate, rubidium acetate, cesium acetate, magnesium acetate, calcium acetate monohydrate, magnesium acetate tetrahydrate, sodium laurate, potassium laurate, lithium stearate, sodium stearate, potassium stearate, magnesium stearate, calcium stearate, sodium gluconate, potassium gluconate, lithium lactate, sodium lactate, potassium lactate, lithium oxalate, sodium oxalate, potassium oxalate monohydrate, lithium succinate, monosodium succinate, disodium succinate, disodium succinate hexahydrate, dipotassium succinate, disodium adipate, dipotassium adipate, sodium gluconate, potassium gluconate, lithium lactate, sodium lactate, potassium lactate, disodium malate 1/2 hydrate, disodium malate trihydrate, dilithium tartrate monohydrate, disodium tartrate dihydrate, potassium bitartrate, dipotassium tartrate, potassium sodium tartrate tetrahydrate, sodium rubidium tartrate, lithium citrate tetrahydrate, monosodium citrate, disodium citrate, trisodium citrate, trisodium citrate dihydrate, sodium aspartate monohydrate, disodium glutamate monohydrate, sodium acrylate, potassium acrylate, sodium sorbitate, potassium sorbitate, monosodium fumarate, lithium benzoate, sodium benzoate, potassium benzoate, cesium benzoate, potassium biphthalate, lithium salicylate monohydrate, sodium salicylate, potassium salicylate and the like may be mentioned, but it is not limited to these.

In consideration of industrial availability and the like, it is preferable that the component (d) is lithium carbonate, anhydrous sodium carbonate, sodium carbonate monohydrate, sodium carbonate decahydrate, potassium carbonate, calcium carbonate, sodium bicarbonate, potassium bicarbonate, lithium formate monohydrate, sodium formate, potassium formate, calcium formate, lithium acetate, sodium acetate, sodium acetate trihydrate, potassium acetate, calcium acetate monohydrate, magnesium acetate tetrahydrate, sodium laurate, potassium laurate, lithium stearate, sodium stearate, potassium stearate, magnesium stearate, calcium stearate, monosodium succinate, disodium succinate, disodium succinate hexahydrate, dipotassium succinate, monosodium citrate, trisodium citrate, trisodium citrate dihydrate, sodium aspartate monohydrate, disodium glutamate monohydrate, sodium acrylate, potassium acrylate, sodium sorbitate, potassium sorbitate, monosodium fumarate, lithium benzoate, sodium benzoate, potassium benzoate, potassium biphthalate, lithium salicylate monohydrate, sodium salicylate, and potassium salicylate.

Further, in consideration of the color of the polyacetal copolymer after the polymerization catalyst (c) has been deactivated, the component (d) is preferably sodium formate, sodium acetate, anhydrous sodium carbonate, sodium carbonate monohydrate, sodium carbonate decahydrate, sodium bicarbonate, disodium succinate hexahydrate, sodium laurate, sodium stearate, and the like.

In the present invention, the salt (d) shown by the above General Formula (2) may be one type, or may be used as a mixture of several types, and it does not matter whether they are in the state of a mixture, a double salt, or the like. As examples of a double salt, sodium sesquicarbonate which consists of sodium carbonate and sodium bicarbonate may be mentioned.

The content of the component (d) is not particularly limited, but my be suitably varied depending on (i) the catalyst amount remaining in the polymer, (ii) the type and amount of the unstable terminal groups generated by the various conditions of the polymerization, and (iii) the degree of activity of the component (d) and the processing conditions (temperature, time, contact speed, and the like) and the like. Specifically, the content of the component (d) is preferably extremely low, and is preferably 0.002 to 1.0 mEq with respect to 1 kg of the crude polyacetal copolymer obtained by the copolymerization reaction, more preferably 0.006 mEq to 0.34 mEq, more preferably 0.009 to 0.17 mEq, and even more preferably 0.009 to 0.10 mEq. (d) By making the content of the component (d) 1.0 mEq or less with respect to 1 kg of the crude polyacetal copolymer, it is possible to make the b value of the polyacetal copolymer after deactivation of the polymerization catalyst (c) be 2.0 or less. Further, by making the content of the component (d) be 0.34 mEq or less with respect to 1 kg of the crude polyacetal copolymer, it is possible to make the b value of the polyacetal copolymer after deactivation of the polymerization catalyst (c) be 0.4 or less.

It is undesirable that the amount of the component (d) is excessive, because there is the possibility that color of the polyacetal copolymer after the polymerization catalyst is deactivated may be inferior, or insufficient, because there is the possibility that the efficiency of the deactivation or the stabilization of the unstable terminal portions may not be sufficiently achieved.

[Catalyst Deactivation Treatment]

In the present invention, in order to improve the color of the polyacetal copolymer after the polymerization catalyst (c) has been deactivated, it is preferable for the content of the component (d) to be extremely small, but an extremely small amount of the component (d) is very difficult to uniformly distribute overall. Therefore, the addition of the component (d) is preferably carried out by any of the following (i) to (iii).

(i) The component (d) is directly added as a solution to the crude polyacetal copolymer obtained by the copolymerization reaction.

(ii) A powder of the polyacetal copolymer is soaked with a solution of the component (d), and is uniformly dispersed, then the powder after the dispersal is added to the crude polyacetal copolymer. Or, (iii) The component (d) remaining in a solid state is uniformly dispersed in a powder of the polyacetal copolymer, and then the power after the dispersal is added to the crude polyacetal copolymer.

In the case of soaking a powder of the polyacetal copolymer, for mixing, a generally used mixing apparatus such as a horizontal cylindrical type, V type, ribbon type, paddle type, high speed flow type or the like may be used. Further, the mixture may be melt treated as-is, or may be melt treated after the solvent is distilled by heating, reduced pressure or the like. Further, the deactivation•stabilizing agent solution may be provided by injection or the like at the feed mouth and/or midway of an extruder. At this time, the deactivation•stabilizing agent solution may be provided split in multiple stages.

By adding the component (d) as described above, it is possible to uniformly disperse overall an extremely small amount of the component (d), and as a result, when measured using a differential colorimeter, the b value of the polyacetal copolymer after deactivation of the polymerization copolymer (c) can be made 2.0 or less. Further, the b value in the present specification is the value displayed using a differential colorimeter SE-2000 (Nippon Denshoku Industries Co., Ltd.), measured when a predetermined amount of pellets is inserted into a cell for measuring pellets (round cell), placed on the test piece support, and the cover is closed.

In particular, by using at least one selected from sodium formate, sodium acetate, anhydrous sodium carbonate, sodium carbonate monohydrate, sodium carbonate decahydrate, sodium bicarbonate, trisodium citrate dihydrate, disodium succinate hexahydrate, sodium laurate, and sodium stearate as the component (d), if the added amount is appropriate, it is possible to make the b value 0.0 or less.

Further, anhydrous sodium carbonate is also referred to by the name soda ash, sodium bicarbonate is also referred to by the name baking soda, but the performance of either is equivalent to anhydrous sodium carbonate or sodium bicarbonate.

In the present invention, after polymerization, when carrying out the deactivation treatment of the catalyst, the less unreacted monomer the better, and the unreacted monomer (indicating the total of the main monomer and the comonomer) is 10 wt % or less of the crude copolymer, moreover 5 wt % or less, and particularly preferably 3 wt % or less. In this way, by processing the crude polyacetal copolymer generated by the polymerization without carrying out washing, it is possible to achieve an especially desirable embodiment of the present invention. To reduce the unreacted monomer, in general the polymerization ratio should be increased to at least a certain value, and in the case of the present invention this can be easily achieved by suitably adjusting the amount of catalyst used and the polymerization time (for the continuous type, the retention time), and a heteropoly acid catalyst which has a high activity is used, thus even with a small amount of catalyst, this can be achieved in a relatively short time. Or, after the copolymerization reaction, a portion of the residual monomers may be evaporated or gasified and eliminated, to reach a specified amount of residual monomers. Further, during the copolymerization or after the copolymerization, vaporized and recovered unreacted trioxane and comonomers may be liquified and reused as-is as a portion of the raw material monomers, and this is more economical.

Further, if necessary, it is possible to co-use a catalyst deactivation agent or decomposition treatment agent for unstable terminals of the prior art, along with the above component (d).

In the present invention, the addition of the component (d) which functions as a deactivation agent•stabilization treatment agent may be at a stage either before the melting or after the melting of the crude polyacetal copolymer, and may also be carried out a both of these stages. Further, as the addition method of the component (d), it may be divided and supplied in multiple stages.

Further, when adding the component (d) as a deactivation•stabilization processing agent, it is preferable for the crude copolymer to be a fine powder, and for this it is preferable for the reaction apparatus to have a function for sufficiently pulverizing the aggregated polymer, but the reaction product after polymerization may also be pulverized using a separate grinder. The granularity of the crude copolymer in the deactivation treatment is such that 90 wt % or more is 10 mm or less, preferably 4 mm or less, more preferably 2 mm or less.

The melt kneading treatment device is not particularly limited, but is one having an function for kneading the molten copolymer, and preferably having a vent function, for example, a single axis or multi axis continuously extruding kneader or co-kneader having at least one vent hole, or the like, can be mentioned. In the melt kneading treatment of the present invention, the complete deactivation of the catalyst and reduction and stabilization of the unstable terminal portions is carried out. The melt kneading treatment is preferably in a temperature range of from the melting point of the copolymer up to 260° C. If higher than 260° C., decomposition and degradation of the polymer occur, which is not desirable.

In the present invention, the above mentioned melt kneading treatment is preferably carried out under the presence of an antioxidant. As the antioxidant, a polyacetal resin of the prior art which is a substance well-known as a stabilizer, for example various hindered phenolic antioxidants and the like may be used. For example, 2,6-di-t-butyl-4-methylphenol, triethyleneglycol-bis-[3-(3-t-butyl-5-methyl-4-hydroxyphenyl)propionate], 1,6-hexanediol-bis-[3-(3,5-di-t-butyl-4-hydroxyphenyl)propionate]methane, N,N'-hexamethylenebis (3,5-di-t-butyl-4-hydroxyhydrocinnamide), 2-t-butyl-6-(3'-t-butyl-5'-methyl-2'-hydroxydibenzyl)-4-methylphenylacrylate, 3,9-bis[2-{(3-t-butyl-4-hydroxy-5-methylphenyl)propionyloxy}-1,1'-dimethylethyl]-2,4,8,10-tetraoxaspiro[5,5]-undecane and the like may be mentioned. Moreover, in one preferred embodiment, polymerization is performed with a portion of, or all of these hindered phenolic antioxidants added in advance to the main monomer or comonomer before polymerization, and there is no adverse effect on the activity of the polymerization catalyst so long as the added amount of these hindered phenolic antioxidants is not particularly excessive.

Furthermore, there is no objection to adding a well-known substance as a stabilizer of various polyacetal resins as required at this stage. Furthermore, for example, an inorganic filler such as glass fibers, crystallization promoter (nucleation agent), mold release agent, antioxidant and the like may also be added.

As described above, compound (d) is added as a deactivation•stabilizing treatment agent to the crude copolymer, and after a melt kneading treatment, usually, formaldehyde gas generated by decomposition, unreacted monomers, oligomers, deactivation•stabilizing agent and the like are eliminated from the vent part of the extrusion device under reduced pressure, and pellets or the like are formed to make a product for resin manufacturing. The pellets are dried if necessary. In the case of drying, for example, drying is carried out on the order of 135° C. for 4 hours

EXAMPLES

Below, the present invention is specifically explained by the Examples, but the present invention is not limited to these.

TABLE 1

| | | (b) Comonomer Type | (C) Polymerization Type | Amount (ppm) | Deactivation agent (Salt (d) in the examples) Name | Amount ppm | Meq with respect to 1 kg of the crude polyacetal copolymer | Addition method |
|---|---|---|---|---|---|---|---|---|
| Example | 1 | 1,3-dioxolane | Phosphotungstic acid | 2.0 | Anhydrous sodium carbonate | 0.25 | 0.0024 | Solid |
| | 2 | 1,3-dioxolane | Phosphotungstic acid | 2.0 | Anhydrous sodium carbonate | 0.5 | 0.0047 | Solid |
| | 3 | 1,3-dioxolane | Phosphotungstic acid | 2.0 | Sodium bicarbonate | 0.5 | 0.0060 | Solid |
| | 4 | 1,3-dioxolane | Phosphotungstic acid | 2.0 | Anhydrous sodium carbonate | 1 | 0.0094 | Solid |
| | 5 | 1,3-dioxolane | Phosphotungstic acid | 2.0 | Sodium bicarbonate | 1 | 0.0119 | Solid |
| | 6 | 1,3-dioxolane | Phosphotungstic acid | 2.0 | Sodium formate | 1 | 0.0147 | 10 wt % aqueous solution |
| | 7 | 1,3-dioxolane | Phosphotungstic acid | 2.0 | Sodium formate | 2 | 0.0294 | 10 wt % aqueous solution |
| | 8 | 1,3-dioxolane | Phosphomolybdic acid | 2.5 | Sodium stearate | 10 | 0.0327 | Solid |
| | 9 | 1,3-dioxolane | Phosphotungstic acid | 2.0 | Anhydrous sodium carbonate | 5 | 0.0472 | Solid |
| | 10 | 1,3-dioxolane | Phosphotungstic acid | 2.0 | Anhydrous sodium carbonate | 5 | 0.0472 | 10 wt % aqueous solution |

TABLE 1-continued

| | | (b) Comonomer Type | (C) Polymerization Type | Amount (ppm) | Deactivation agent (Salt (d) in the examples) | | | |
|---|---|---|---|---|---|---|---|---|
| | | | | | Name | ppm | Meq with respect to 1 kg of the crude polyacetal copolymer | Addition method |
| | 11 | 1,3-dioxolane | Phosphotungstic acid | 2.0 | Sodium bicarbonate | 5 | 0.0595 | Solid |
| | 12 | 1,3-dioxolane | Phosphotungstic acid | 2.0 | Sodium acetate | 5 | 0.0610 | Solid |
| | 13 | 1,3-dioxolane | Phosphotungstic acid | 2.0 | Potassium carbonate | 10 | 0.0725 | 10 wt % aqueous solution |
| | 14 | 1,3-dioxolane | Phosphotungstic acid | 2.0 | Sodium formate | 5 | 0.0735 | Solid |
| | 15 | 1,3-dioxolane | Phosphotungstic acid | 2.0 | Sodium stearate | 25 | 0.0817 | Solid |
| | 16 | 1,3-dioxolane | Phosphotungstic acid | 2.0 | Calcium stearate | 25 | 0.0824 | Solid |
| | 17 | 1,3-dioxolane | Phosphotungstic acid | 2.0 | Magnesium stearate | 25 | 0.0846 | Solid |
| | 18 | 1,3-dioxolane | Phosphotungstic acid | 2.0 | Trisodium citrate dihydrate | 25 | 0.0850 | Solid |
| | 19 | 1,3-dioxolane | Phosphotungstic acid | 2.0 | Disodinm succinate hexahydrate | 25 | 0.0926 | Solid |
| | 20 | 1,3-dioxolane | Phosphotungstic acid | 2.0 | Sodium laurate | 25 | 0.1126 | Solid |
| | 21 | 1,3-dioxolane | Phosphotungstic acid | 2.0 | Potassium formate | 10 | 0.1235 | 10 wt % aqueous solution |
| | 22 | 1,3-dioxolane | Silicotungstic acid | 2.2 | Sodium stearate | 50 | 0.1634 | Solid |
| | 23 | 1,4-butanediol | Phosphotungstic acid | 2.0 | Sodium benzoate | 25 | 0.1736 | Solid |
| | 24 | 1,3-dioxolane | Phosphotungstic acid | 2.0 | Sodium acrylate | 25 | 0.2660 | solid |
| | 25 | Diethylene glycol | Phosphotungstic acid | 2.0 | Lithium carbonate | 25 | 0.3383 | Solid |
| | 26 | 1,3-dioxolane | Phosphotungstic acid | 2.0 | Anhydrous sodium carbonate | 100 | 0.9434 | Solid |
| | 27 | 1,3-dioxolane | Phosphotungstic acid | 2.0 | Lithium formate monohydrate | 50 | 0.9623 | Solid |
| Comparative example | 1 | 1,3-dioxolane | Phosphotungstic acid | 2.0 | Melamine | 1000 | 7.9 | Solid |
| | 2 | 1,3-dioxolane | Phosphotungstic acid | 2.0 | Melamine resin | 1000 | 1.9 | Solid |
| | 3 | 1,3-dioxolane | Boron trifluoride | 40 | Sodium stearate | 1000 | 3.3 | Solid |

Examples 1 to 27

Copolymerization of Trioxane which is the Main Monomer (a) and Cyclic Ether and/or Cyclic Formal which is the Comonomer (b)

As the polymerization reaction apparatus, a continuous biaxial polymerization device was used. This polymerization device is equipped with a jacket for passing the medium for heating or cooling at its outer side, and in its inner portion, two rotating shafts equipped with a plurality of paddles for stirring and propelling are disposed in the lengthwise direction. Water at a temperature of 80° C. is passed through the jacket of this biaxial polymerization device, and while rotating the two rotating shafts at a constant speed, at one end thereof, a mixed liquid comprising 96.2 wt % trioxane as the main monomer (a) which comprises 1000 ppm of methylal as a chain transfer agent, and 3.8 wt % of the comonomer (b) shown in Table 1, is continuously supplied, while a methyl formate solution comprising 0.3 wt % of the heteropoly acid shown in Table 1 as the polymerization catalyst (c) is continuously added in the amount shown in Table 1 to the total monomers and polymerization is carried out. In Table 1, the added amount of the polymerization catalyst is a weight ratio with respect to the total of all of the monomers (units: ppm) and a molar equivalent with respect to 1 kg of the crude polyacetal copolymer obtained by the polymerization reaction (units: mEq).

[Deactivation of the Polymerization Catalyst (c)]

As the reaction product of the polymerization (crude polyacetal copolymer) is discharged from a discharge opening provided at the other end of the polymerization device, in order to deactivate the catalyst, the salt (d) shown in Table 1 is added. The addition of the salt (d) is carried out as follows. In the case that the column of the "addition method" is "solid", the component (d) remaining in a solid state is evenly dispersed in a powder of the polyacetal copolymer, and then the powder after the dispersal is added to the above reaction product. In the case that the column of "addition method" is "aqueous solution", a 10 wt % aqueous solution comprising the component (d) is prepared so as to have a prescribed mole number, and 10 mL of this aqueous solution is added to a powder of the polyacetal copolymer, which is added to the above described reaction product.

Next, 0.3 wt % of triethylene glycol-bis[3-(3-t-butyl-5-methyl-4-hydroxyphenyl)propionate] is added as an antioxidant, and using a biaxial extruder equipped with a vent, melt-kneading and extruding were performed at a temperature of 220° C. and a degree of vacuum of 5 mmHg at the vent portion, and the pellets of the polyacetal copolymer of Examples 1 to 27 were prepared.

Comparative Examples 1 to 3

The pellets of the polyacetal copolymers of Comparative Examples 1 and 2 were prepared by the same method of Example 1, with the exception that, as a deactivation agent, the compound shown in Table 1 (melamine or melamine resin) is added only in the amount shown in Table 1. Further, the pellets of the polyacetal copolymer of Comparative Example 3 were prepared by the same method of Example 15, with the exception that boron trifluoride was used as the polymerization catalyst, used in the amount disclosed in Table 1.

Evaluation

The pellets of the polyacetal copolymers of the Examples and the Comparative Examples were dried under conditions of 135° C. and 4 hours, then the melt index (MI), alkali decomposition ratio, formaldehyde emission amount, and the color of the polyacetal copolymer after deactivation of the polymerization catalyst (c) were measured.

[Evaluation of the Melt Index (MI)]

The values measured using a melt index measuring device: Melt Indexer L202 (Takara Thermistor Co., Ltd.), with a load of 2.16 kg, and a temperature of 190° C., are taken as the melt index (g/10 min). The results are shown in Table 2. In the present Examples, the melt index (MI) was taken as a characteristic value corresponding to the molecular weight. Namely, it was judged that the lower the MI, the higher the molecular weight; and the higher the MI, the lower the molecular weight.

[Evaluation of Alkali Decomposition Ratio (Present Amount of Unstable Portions)]

The copolymer pellets of the Examples and Comparative Examples were pulverized and about 1 g was precisely weighed, and was loaded in a closable vessel along with 100 mL of a 50% methanol aqueous solution containing 0.5 wt % of ammonium hydroxide, and the vessel was closed, and after heating at 180° C. for 45 min, the amount of formaldehyde decomposed and eluted in the solution was quantitatively analyzed. The results are shown in Table 2. The alkali decomposition ratio is shown as a ratio with respect to 100 wt % of the copolymer pellets (units: %).

[Evaluation of Formaldehyde Emission Amount]

Samples from the Examples and Comparative Examples were filled into a cylinder held at 200° C., and after melting for 5 min, the melt was extruded from the cylinder into a closed container. Nitrogen gas was made to flow through this closed container, and the formaldehyde included in the exiting nitrogen gas was dissolved in water and collected, and by measuring the concentration of the formaldehyde in the water, the weight of the formaldehyde emitted from the melt was obtained. This weight of formaldehyde was excluded from the weight of the melt, and taken as the formaldehyde emission amount (units ppm). The results are shown in Table 2.

[Evaluation of the Coloring in the Pellets]

Using a differential colorimeter SE-2000 (Nippon Denshoku Industries Co., Ltd.), a predetermined amount of the pellets was introduced into a cell for pellet measurement (round cell), placed on the sample stand, the cover was closed, and the b value displayed when the measurement was taken was read out. The results are shown in Table 2.

TABLE 2

| | | MI g/10 min | Alkali decomposition ratio % | IIcho emission amount ppm | Color B value |
|---|---|---|---|---|---|
| Example | 1 | 11.0 | 0.50 | 9 | −0.43 |
| | 2 | 10.1 | 0.33 | 18 | −0.32 |
| | 3 | 9.9 | 0.31 | 25 | −0.30 |
| | 4 | 9.5 | 0..20 | 36 | −0.25 |
| | 5 | 9.2 | 0.18 | 25 | −0.13 |
| | 6 | 9.0 | 0.21 | 23 | −0.10 |
| | 7 | 9.0 | 0.25 | 23 | −0.09 |
| | 8 | 9.4 | 0.18 | 24 | −0.13 |
| | 9 | 8.9 | 0.14 | 36 | −0.28 |
| | 10 | 8.8 | 0.12 | 30 | −0.20 |
| | 11 | 9.2 | 0.10 | 25 | −0.02 |
| | 12 | 9.0 | 0.12 | 26 | −0.20 |
| | 13 | 8.9 | 0.05 | 22 | 0.05 |
| | 14 | 8.8 | 0.15 | 24 | −0.16 |
| | 15 | 9.5 | 0.17 | 26 | −0.10 |
| | 16 | 9.9 | 0.36 | 34 | 0.02 |
| | 17 | 9.9 | 0.36 | 34 | 0.04 |
| | 18 | 9.8 | 0.22 | 40 | −0.08 |
| | 19 | 9.6 | 0.21 | 21 | −0.08 |
| | 20 | 9.1 | 0.19 | 32 | 0.01 |
| | 21 | 8.8 | 0.07 | 46 | 0.18 |
| | 22 | 9.5 | 0.18 | 24 | 0.09 |
| | 23 | 9.3 | 0.15 | 20 | 0.20 |
| | 24 | 9.4 | 0.23 | 28 | 0.38 |
| | 25 | 8.7 | 0.19 | 30 | 0.40 |
| | 26 | 9.0 | 0.10 | 55 | 1.95 |
| | 27 | 8.6 | 0.18 | 23 | 0.73 |

TABLE 2-continued

| | | MI g/10 min | Alkali decomposition ratio % | IIcho emission amount ppm | Color B value |
|---|---|---|---|---|---|
| Comparative example | 1 | 9.1 | 0.54 | 59 | −0.30 |
| | 2 | 9.9 | 0.60 | 58 | −0.20 |
| | 3 | 12.2 | 0.85 | 280 | 3.5 |

In the present invention, it was confirmed that because the polymerization catalyst is a heteropoly acid shown by the previously mentioned General Formula (1), and the deactivation agent for this heteropoly acid is a carbonate, bicarbonate, or carboxylate of an alkali metal or alkali earth metal or a hydrate thereof (d), a high polymerization yield can be obtained with extremely small amounts, moreover, after polymerization, by only adding the component (d) to the crude copolymer and melt kneading, it was possible to simply provide a polyacetal copolymer of extremely high quality as a product (Examples 1 to 27).

In particular, when the content of the component (d) with respect to 1 kg of the crude polyacetal copolymer is 0.006 mEq to 0.34 mEq, the MI value is 10 g/10 min or less, and further, the b value is 0.4 or less, and it was not only possible to efficiently deactivate the polymerization catalyst and to sufficiently stabilize the unstable terminals, but it was also confirmed that the color of the polyacetal copolymer after the deactivation of the polymerization catalyst (c) is also excellent (Examples 3 to 25). Further, when the content of the component (d) with respect to 1 kg of the crude polyacetal copolymer is 0.009 mEq to 0.17 mEq, it was confirmed that the b value is 0.2 or less, and the color of the polyacetal copolymer after the deactivation of the polymerization catalyst (c) is excellent (Examples 4 to 23). Further, when the content of the component (d) with respect to 1 kg of the crude polyacetal copolymer was 0.009 mEq to 0.10 mEq, it was confirmed that the b value is 0.1 or less, and the color of the polyacetal copolymer after the deactivation of the polymerization catalyst (c) is excellent (Examples 4 to 19).

Further, when the component (d) was sodium formate, sodium acetate, anhydrous sodium carbonate, sodium bicarbonate, sodium stearate, trisodium citrate dihydrate, or disodium succinate hexahydrate, it was confirmed that the b value is 0.0 or less, and this is suitable not only from the viewpoint of ease of industrial availability, but also in the point of the color of the polyacetal copolymer after the deactivation of the polymerization catalyst (c) (Examples 4 to 15, 18, and 19).

On the other hand, when the deactivation agent is melamine or melamine resin, it was confirmed that in order to sufficiently deactivate the catalyst, a large amount of the deactivation agent was necessary compared to the Examples, moreover, it was not possible to satisfy the quality level which has been demanded in recent years in terms of the alkali decomposition ratio, and the formaldehyde emission amount (Comparative Examples 1 and 2). On the other hand, also when boron trifluoride is used as the polymerization catalyst, it was confirmed that a large amount of the deactivation agent was necessary, and further, it was not possible to satisfy the quality level which has been demanded in recent years in terms of the alkali decomposition ratio, and the formaldehyde emission amount (Comparative Example 3).

The invention claimed is:

1. A production method for a polyacetal copolymer with trioxane as a main monomer (a) and a cyclic ether and/or cyclic formal having at least one carbon-carbon bond as a comonomer (b), wherein when producing the polyacetal copolymer, copolymerization is carried out using a heteropoly acid shown by the below General Formula (1) as a polymerization catalyst (c), and the polymerization catalyst (c) is deactivated by adding to a reaction product a carbonate, bicarbonate, or carboxylate of an alkali metal or alkali earth metal or a hydrate thereof (d), and performing a melt kneading treatment,

  (1)

wherein, $M^1$ is a central element consisting of P and/or Si, $M^2$ is one or more coordination elements selected from the group consisting of W, Mo, and V, and x is an integer from 1 to 10, y is an integer from 6 to 40, z is an integer from 10 to 100, m is an integer of 1 or more, and n is an integer of 0 to 50, and wherein an added amount of the carbonate, bicarbonate or carboxylate of an alkali metal or alkali earth metal or a hydrate thereof (d) with respect to 1 kg of the crude polyacetal copolymer obtained by the copolymerization reaction is 0.006 to 0.34 mEq.

2. A production method for a polyacetal copolymer according to claim 1, wherein the comonomer (b) is at least one selected from the group consisting of 1,3-dioxolane, diethylene glycol formal, 1,4-butanediol formal, 1,3-dioxane, and ethylene oxide.

3. A production method for a polyacetal copolymer according to claim 1, wherein the heteropoly acid is at least one selected from phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, or silicomolybdotungstovanadic acid.

4. A production method for a polyacetal copolymer according to claim 1, wherein the carbonate, bicarbonate, or carboxylate of an alkali metal element or alkali earth metal element or a hydrate thereof (d) is:
(i) at least one carbonate selected from the group consisting of lithium carbonate, sodium carbonate, potassium carbonate, magnesium carbonate, calcium carbonate or barium carbonate, and a hydrate thereof,
(ii) at least one bicarbonate selected from the group consisting of lithium bicarbonate, sodium bicarbonate, or potassium bicarbonate, and a hydrate thereof,
(iii) at least one aliphatic carboxylate selected from the group consisting of lithium formate, sodium formate, potassium formate, magnesium formate, calcium formate, barium formate, lithium acetate, sodium acetate, potassium acetate, magnesium acetate, calcium acetate, barium acetate, lithium laurate, sodium laurate, potassium laurate, lithium stearate, sodium stearate, potassium stearate, magnesium stearate, calcium stearate, monosodium succinate, disodium succinate, dipotassium succinate, lithium citrate, monosodium citrate, trisodium citrate, sodium aspartate, or disodium glutamate, and a hydrate thereof,
(iv) at least one unsaturated aliphatic carboxylate selected from the group consisting of sodium acrylate, potassium acrylate, sodium sorbate, potassium sorbate, or monosodium fumarate, and a hydrate thereof, or
(v) at least one aromatic carboxylate selected from the group consisting of lithium benzoate, sodium benzoate, potassium benzoate, potassium biphthalate, lithium salicylate, sodium salicylate, potassium salicylate, and a hydrate thereof.

5. A production method for a polyacetal copolymer according according to claim 4, wherein the carbonate, bicarbonate, or carboxylate of an alkali metal or alkali earth metal or a hydrate thereof (d) is at least one selected from the group consisting of sodium formate, sodium acetate, sodium carbonate, sodium bicarbonate, disodium succinate, sodium laurate, sodium stearate and calcium stearate.

6. A production method for a polyacetal copolymer according to claim 1, wherein an addition of the carbonate, bicarbonate, or carboxylate of an alkali metal or alkali earth metal or a hydrate thereof (d) to the reaction product is:
(i) the carbonate, bicarbonate, or carboxylate of an alkali metal or alkali earth metal or a hydrate thereof (d) is directly added as a solution to the crude polyacetal copolymer obtained by the copolymerization reaction, or
(ii) a powder of a polyacetal copolymer is soaked with a solution of the carbonate, bicarbonate, or carboxylate of an alkali metal or alkali earth metal or a hydrate thereof (d), and is uniformly dispersed, then the powder after the dispersal is added to the crude polyacetal copolymer, or
(iii) the carbonate, bicarbonate, or carboxylate of an alkali metal or alkali earth metal or a hydrate thereof (d) in the form of a solid is uniformly dispersed in a polyacetal copolymer powder, then the powder after the dispersal is added to the crude polyacetal copolymer, and
a b value of polyacetal copolymer pellets after deactivation of the polymerization catalyst (c), measured using a differential colorimeter, is 2.0 or less.

* * * * *

UNITED STATES PATENT AND TRADEMARK OFFICE
CERTIFICATE OF CORRECTION

PATENT NO.         : 9,657,136 B2
APPLICATION NO.    : 14/442659
DATED              : May 23, 2017
INVENTOR(S)        : Eiji Masuda, Tomohiro Monma and Tadahiro Horiguchi It is certified that error appears in the above-identified patent and that said Letters Patent is hereby corrected as shown below:

In the Specification

Column 5, Line 20, "diethyleneglycol" should be --diethylene glycol--.

Column 5, Line 39, "pentaerythyritol" should be --pentaerythritol--.

Column 8, Line 24, "sorbitate," should be --sorbitrate,--. (First Occurrence)

Column 8, Line 24, "sorbitate," should be --sorbitrate,--. (Second Occurrence)

Column 8, Line 45, "sorbitate," should be --sorbitrate,--. (First Occurrence)

Column 8, Line 45, "sorbitate," should be --sorbitrate,--. (Second Occurrence)

Column 9, Line 12, "sorbitate," should be --sorbitrate,--.

Column 9, Line 13, "sorbitate," should be --sorbitrate,--.

Column 9, Lines 32-33, "sorbitate," should be --sorbitrate,--.

Column 9, Line 33, "sorbitate," should be --sorbitrate,--.

Column 9, Line 51, "my be" should be --may be--.

Column 11-12, Line 62, "carbonale" should be --carbonate--.

Column 12, Line 40, after "hours" insert --.--.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,657,136 B2

In the Claims

Column 18, Line 18, "according according" should be --according--.